(12) United States Patent
Metry et al.

(10) Patent No.: US 12,283,875 B2
(45) Date of Patent: Apr. 22, 2025

(54) ELECTRIC DRIVE UNIT WITH ROTOR HEAT SINK FORMED OF HEAT SINK ELEMENTS

(71) Applicant: AMERICAN AXLE & MANUFACTURING, INC., Detroit, MI (US)

(72) Inventors: Samer Metry, Sterling Heights, MI (US); Cory J. Padfield, Royal Oak, MI (US); Jeffrey J. Ronning, Grosse Pointe Farms, MI (US); Paul Noble, Ypsilanti, MI (US); Rita Arnold, LaSalle (CA)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 203 days.

(21) Appl. No.: 17/690,440

(22) Filed: Mar. 9, 2022

(65) Prior Publication Data

US 2023/0291282 A1 Sep. 14, 2023

(51) Int. Cl.
| | |
|---|---|
| *H02K 9/22* | (2006.01) |
| *H02K 5/20* | (2006.01) |
| *H02K 7/116* | (2006.01) |
| *H02K 9/19* | (2006.01) |

(52) U.S. Cl.
CPC ............ *H02K 9/227* (2021.01); *H02K 5/203* (2021.01); *H02K 7/116* (2013.01); *H02K 9/19* (2013.01)

(58) Field of Classification Search
CPC ........ H02K 9/227; H02K 5/203; H02K 7/116; H02K 9/19; H02K 9/32

USPC ........................................................... 310/61
See application file for complete search history.

(56) References Cited

U.S. PATENT DOCUMENTS

| | | | |
|---|---|---|---|
| 6,472,782 B1* | 10/2002 | Selci .................... | B23Q 11/127 310/58 |
| 2009/0121563 A1 | 5/2009 | Zhou et al. | |
| 2010/0277028 A1* | 11/2010 | Alexander ........... | H02K 1/2773 29/598 |

(Continued)

FOREIGN PATENT DOCUMENTS

| | | | |
|---|---|---|---|
| CN | 109067092 A | 12/2018 | |
| DE | 102018005365 A1 * | 1/2020 | ............... H02K 9/06 |

(Continued)

OTHER PUBLICATIONS

DE-102019208304-A1_Translation (Year: 2023).*

(Continued)

*Primary Examiner* — Christopher M Koehler
*Assistant Examiner* — Ahmed F Seck
(74) *Attorney, Agent, or Firm* — Reising Ethington P.C.

(57) ABSTRACT

An electric drive unit that includes an electric motor having motor output shaft and a heat sink that is received therein. The heat sink is comprises of a plurality of discrete heat sink elements that are stacked together and inserted into the motor output shaft. The heat sink elements have central hubs that cooperate to form a coolant supply passage that extends centrally through the heat sink. Each of the heat sink elements defines a plurality of discrete coolant return passages that are relatively shorter in length than the central hubs so that a void annular space is formed between the coolant return passages of adjacent heat sink elements.

15 Claims, 6 Drawing Sheets

(56) References Cited

U.S. PATENT DOCUMENTS

| | | | |
|---|---|---|---|
| 2011/0057522 A1* | 3/2011 | Blessing .................. | B60K 6/48 |
| | | | 310/78 |
| 2015/0084456 A1* | 3/2015 | Chang ...................... | H02K 1/26 |
| | | | 310/61 |
| 2018/0147937 A1* | 5/2018 | Muster ................... | B60K 17/24 |
| 2019/0173332 A1 | 6/2019 | Ronning et al. | |
| 2020/0227964 A1* | 7/2020 | Ronning .............. | H02K 1/2733 |
| 2020/0251963 A1* | 8/2020 | Woody ..................... | H02K 5/18 |
| 2021/0391762 A1 | 12/2021 | Chen et al. | |
| 2022/0037241 A1 | 2/2022 | Downs et al. | |

FOREIGN PATENT DOCUMENTS

| | | | | |
|---|---|---|---|---|
| DE | 102019208304 A1 * | 12/2020 | ............... | H02K 9/19 |
| JP | 2010220340 A | 9/2010 | | |
| KR | 1020200120258 A | 5/2009 | | |
| WO | WO2020/219955 | 10/2020 | | |

OTHER PUBLICATIONS

PCT International Search Report dated Jun. 23, 2023 for corresponding PCT application No. PCT/US2023/014322, filed Mar. 2, 2023.

International Serial No. PCT/US2022/016251 application and drawings filed Feb. 14, 2022 (Ronning et al.).

* cited by examiner

ELECTRIC DRIVE UNIT WITH ROTOR HEAT SINK FORMED OF HEAT SINK ELEMENTS

FIELD

The present disclosure relates to an electric drive unit with a rotor heat sink that is formed of heat sink elements.

BACKGROUND

This section provides background information related to the present disclosure which is not necessarily prior art.

There is increasing interest on the part of vehicle manufacturers to incorporate an electric motor into the vehicle for purposes of providing propulsive power. To minimize the cost and size of the electric motor, it is frequently necessary to cool components of the electric motor with a flow of liquid coolant, such as the rotor of the electric motor. One known method for cooling the rotor of an electric motor utilizes a heat exchanger inside a hollow shaft of the rotor. The flow of liquid coolant is input to the heat exchanger at a first end of the rotor to a first passage, which is formed along the rotational axis of the rotor. At least part of the flow of liquid coolant that exits the first passage at a second, opposite end of the rotor is returned to the first end of the rotor through a plurality of second passages that are disposed concentrically about the first passage.

While such configurations are suited for their intended purpose, we have noted that the known configuration can be relatively costly and/or difficult to manufacture. In this regard, the exterior surface of the heat exchanger must contact the interior surface of the hollow shaft throughout the entire length of the heat exchanger to maximize potential heat transfer between the hollow shaft and the heat exchanger. Consequently, the known designs have the practical effect of requiring close tolerances between the exterior surface of the heat exchanger and the interior surface of the hollow shaft. Configuration in this manner can be relatively costly and/or relatively difficult to manufacture.

SUMMARY

This section provides a general summary of the disclosure, and is not a comprehensive disclosure of its full scope or all of its features.

In one form, the present disclosure provides an electric drive unit that includes a stator, a rotor, a motor output shaft, and a heat sink. The rotor is received in the stator and is rotatable about an axis. The motor output shaft is received through the rotor and is coupled to the rotor for rotation therewith. The motor output shaft includes a hollow, tubular portion. The heat sink is received in the hollow, tubular portion of the motor output shaft and is formed of a plurality of heat sink elements. Each of the heat sink elements is integrally and unitarily formed to include a central hub, an outer rim and a plurality of first rib members that fixedly couple the central hub to the outer rim. The central hub is hollow and is disposed concentrically about the axis. The outer rim is disposed concentrically about the central hub and engages an inside circumferential surface of the hollow, tubular portion of the motor output shaft. Each of the first rib members extends generally radially between the central hub and the outer rim such that a plurality of discrete coolant return passages are formed through the heat sink element. The heat sink elements abut one another such that the central hubs of the heat sink elements form a coolant supply passage that extends through the heat sink. At least one axial end of the central hub extends along the axis further than the outer rim and the first rib members so that a void annular space is provided between the discrete coolant return passages of adjacent pairs of the heat sink elements.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
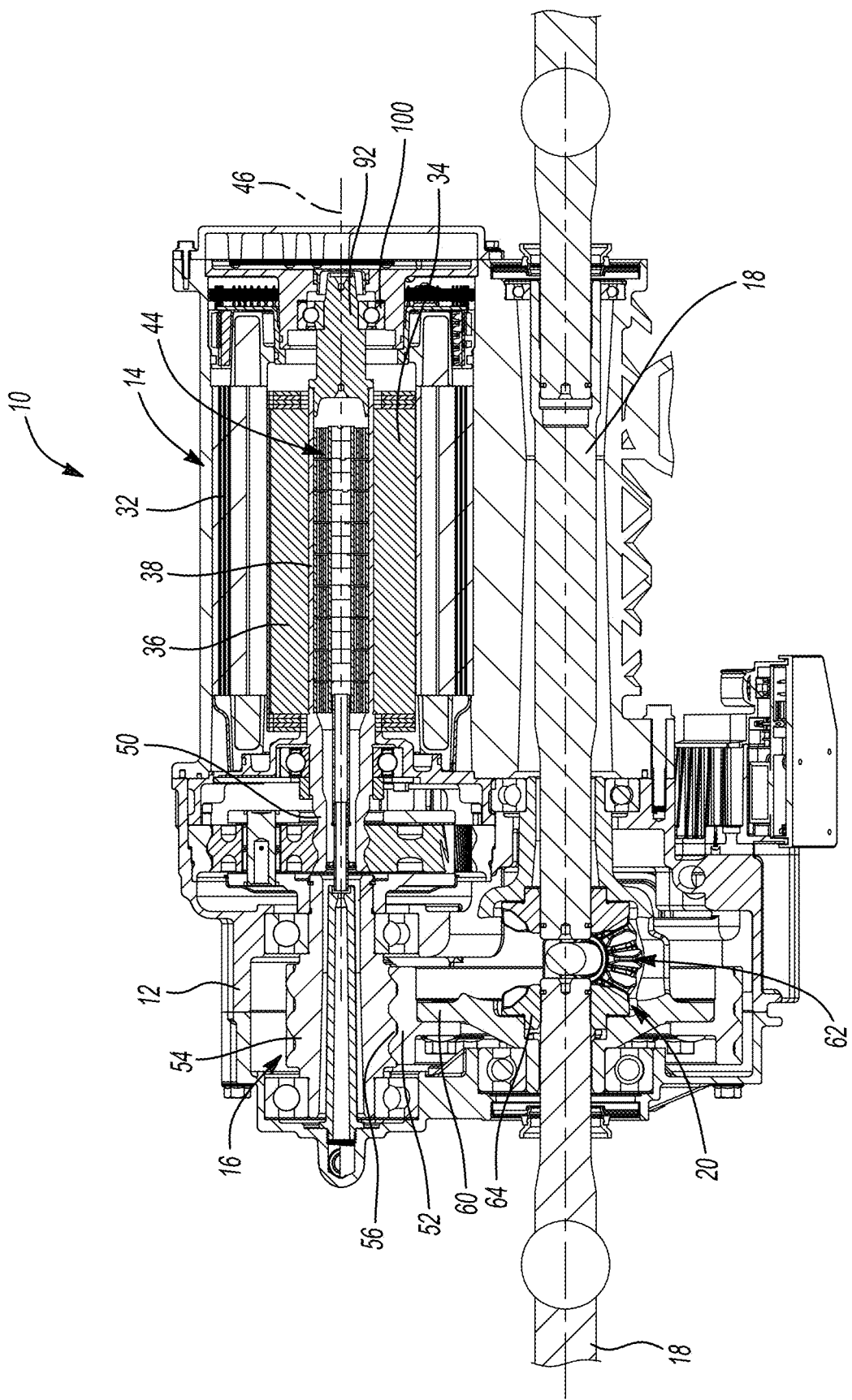
FIG. 1 is a longitudinal section view of an exemplary electric drive module constructed in accordance with the teachings of the present disclosure.

With reference to FIG. 1 of the drawings, an exemplary electric drive unit constructed in accordance with the teachings of the present disclosure is generally indicated by reference numeral 10. The electric drive unit can include a housing assembly 12, an electric motor 14, a transmission 16 and at least one output shaft 18. In the particular example provided, the electric drive unit 10 includes a differential assembly 20 and employs a pair of output shafts 18.

The housing assembly 12 can be configured to house the electric motor 14, the transmission 16 and the differential assembly 20. The electric motor 14 includes a stator 32 and a rotor assembly 34 having a rotor 36, a motor output shaft 38 and a heat sink 44. The rotor 36 is received in the stator 32 and is rotatable about a motor axis 46. The motor output shaft 38 is received through the rotor 36 and is coupled to the rotor 36 for rotation therewith about the motor axis 46. The heat sink 44 is received in the motor output shaft 38. The transmission 16 includes a transmission input gear 50, which is coupled to the motor output shaft 38 for rotation therewith, a transmission output gear 52, and a plurality of intermediate gears 56 that transmit rotary power between the transmission input gear 50 and the transmission output gear 52. The differential assembly 20 includes a differential input member 60 and a differential gearset 62 that includes a pair of differential output members 64. In the example provided, the differential input member 60 is a differential case, and the differential gearset 62 is a bevel gearset where the differential output members 64 are side gears. It will be appreciated, however, that differential gearset 62 could be configured somewhat differently, for example with helical differential pinons and side gears, or could be a type of epicyclic gearset with planet carrier and helical sun, ring and planet gears. Each of the output shafts 18 is coupled for rotation with an associated one of the differential output members 64.

Figure 2:
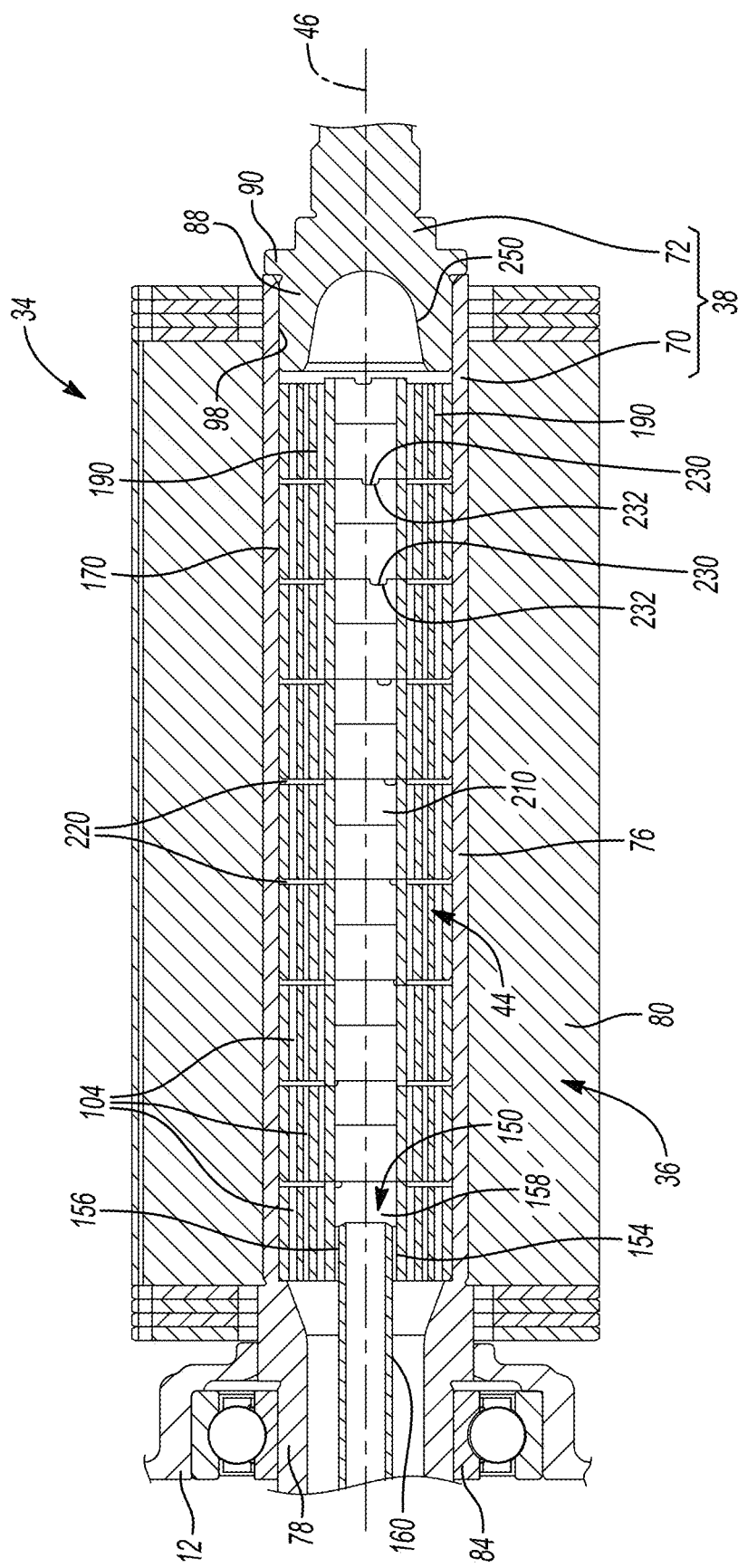
FIG. 2 is an enlarged portion of FIG. 1 illustrating a portion of a rotor assembly in more detail.

With reference to FIG. 2 of the drawings, a portion of the rotor assembly 34 is shown in more detail. The motor output shaft 38 can have a shaft member 70 and an end member 72. The shaft member 70 includes a hollow, tubular portion 76 and a first bearing journal 78. The hollow, tubular portion 76 can be fitted to a core 80 of the rotor 36 with an engineered fit, such as an interference fit or a press fit. A first motor output shaft bearing 84 can be received on the first bearing journal 78 and be engaged to the housing assembly 12 to support the motor output shaft 38 for rotation about the motor axis 46. The end member 72 can include a plug portion 88, an end stop 90, and a second bearing journal 92 (FIG. 1). The plug portion 88 is configured to be received into an open end of the hollow, tubular portion 76 and sealingly engage inside circumferential surface 98 of the motor output shaft 38. The plug portion 88 can be fitted to the inside circumferential surface 98 of the motor output shaft 38 with an engineering fit, such as a press fit. Additionally or alternatively, a sealant could be employed between the inside circumferential surface 98 of the motor output shaft 38 and the plug portion 88 to form a seal therebetween. The end stop 90 can be disposed axially between the plug portion 88 and the second bearing journal 92 (FIG. 1) and can abut an axial end of the shaft member 70 to limit the distance by which the end member 72 is received into the hollow, tubular portion 76. A second motor output shaft bearing 100 (FIG. 1) can be received on a second bearing journal 92 (FIG. 1) and be engaged to the housing assembly 12 to support the motor output shaft 38 for rotation about the motor axis 46. The heat sink 44 can be received into the hollow, tubular portion 76 of the shaft member 70 and can comprise a plurality of heat sink elements 104 that are aligned to one another (i.e., abutting one another in series) along the motor axis 46.

With reference to FIGS. 3 through 6, each of the heat sink elements 104 can be integrally and unitarily formed of a suitable material, such as aluminum, and can define a central hub 120, an outer rim 122 and a plurality of first rib members 124. In the example provided, the heat sink elements 104 are formed as an extrusion and are machined thereafter as needed. It will be appreciated that other manufacturing processes could be employed, such as die casting, and that the heat sink elements 104 could be employed with various features of the heat sink elements 104 being formed in a net-shaped or near net-shaped manner so as to eliminate or reduce machining of the heat sink elements 104.

The central hub 120 is hollow and is disposed concentrically about a longitudinal axis of the heat sink element 104. The central hub 120 defines a central bore 150 that extends through the heat sink element 104. The inside circumferential surface 152 of the central bore 150 could be net-formed, for example in situations where the heat sink element 104 is formed in an extrusion or die casting operation, or could be machined in whole or in part. In the example provided a first portion 154 of the central bore 150 is machined (i.e., bored) to a pre-determined diameter that is configured to receive a bushing 156 (FIG. 2), while the remaining portion 158 of the central bore 150 is unfinished (not machined after extrusion). The bushing 156 (FIG. 2) is configured to receive a stationary coolant supply pipe 160 (FIG. 2) therein that supplies a liquid coolant to the interior of the central bore 150.

Figure 3:
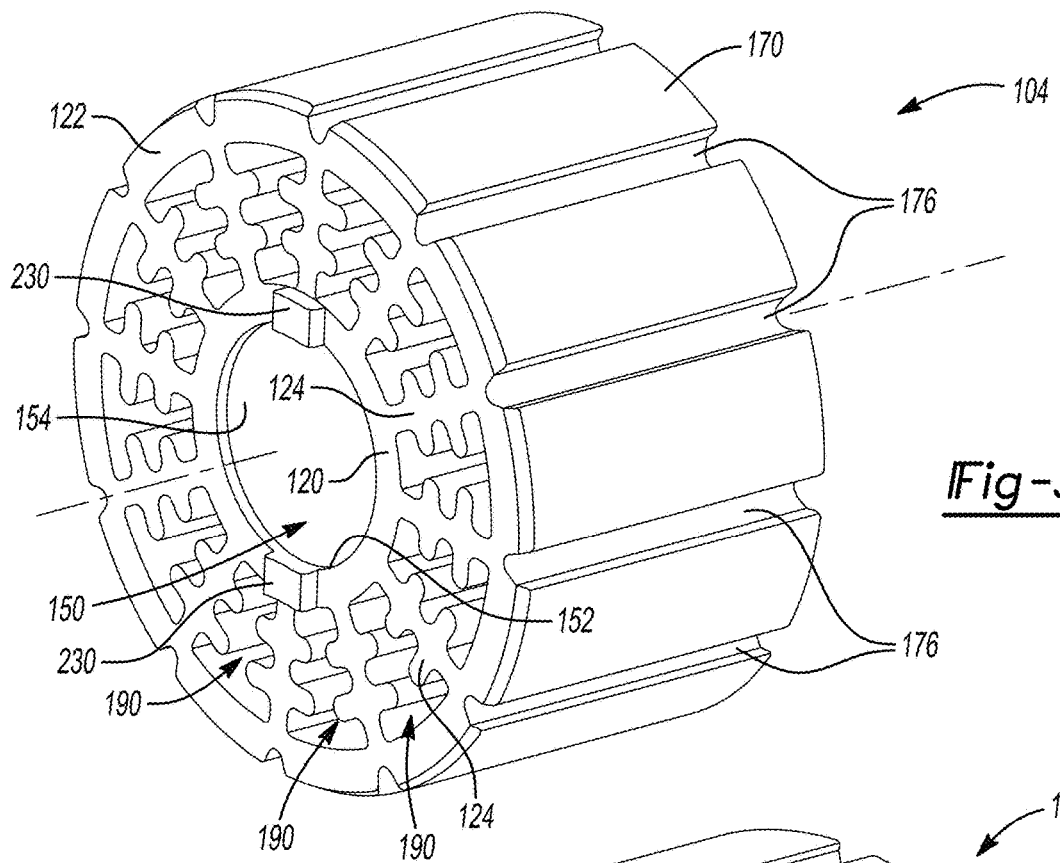
FIGS. 3 and 4 are front and rear perspective views of an exemplary heat sink element that is employed to form a portion of the rotor assembly.
Figure 4:
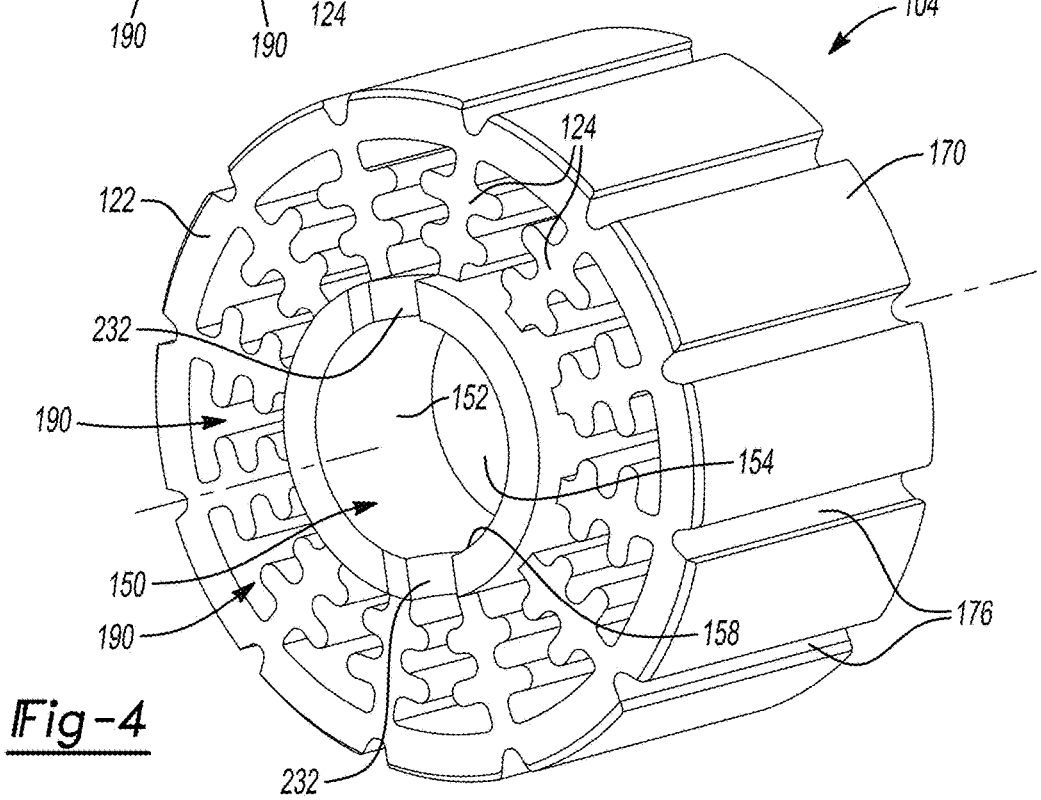
Figure 5:
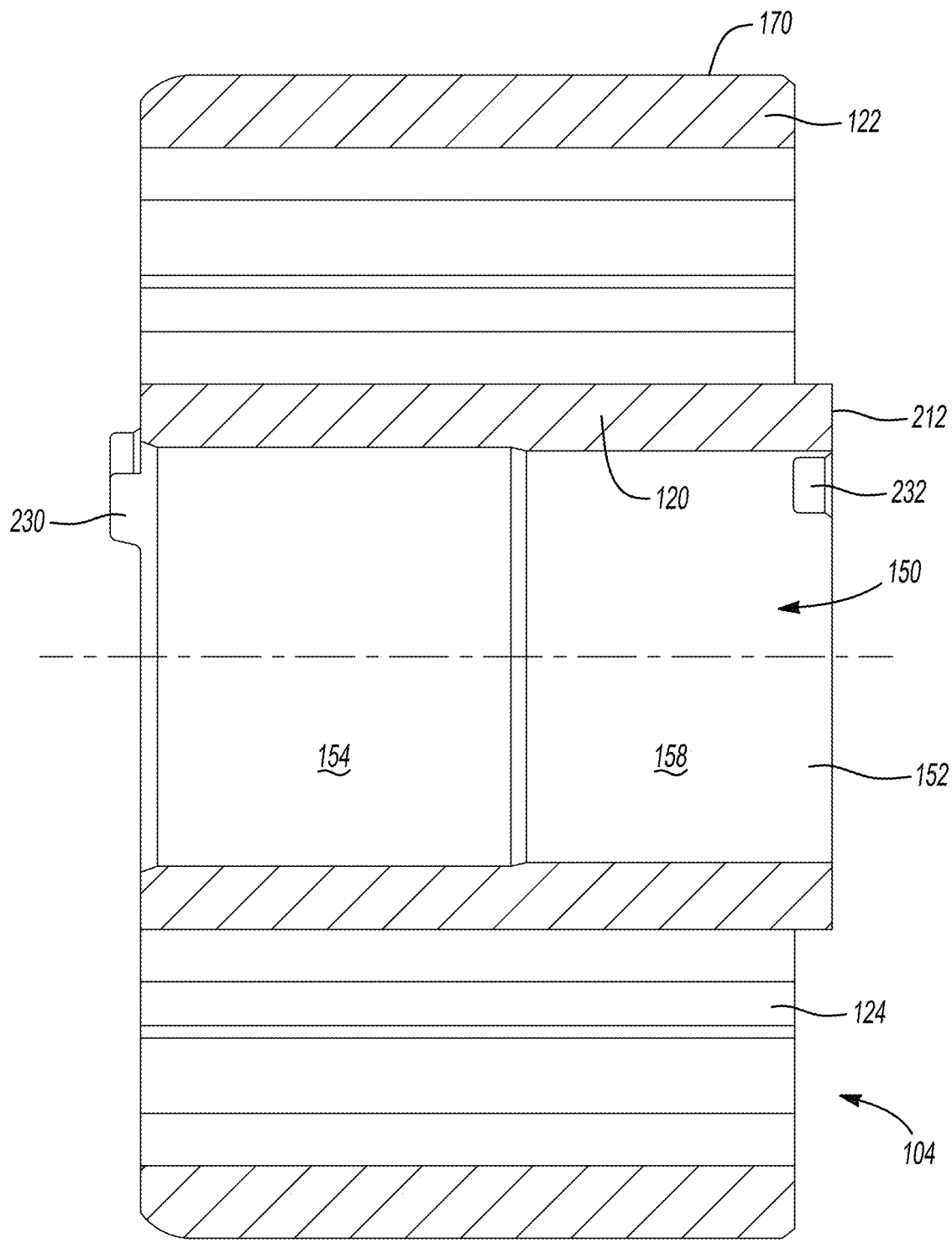
FIG. 5 is a longitudinal section view of the heat sink element of FIG. 3.

With reference to FIGS. 2, 3 and 5, the outer rim 122 is disposed concentrically about the central hub 120 and is configured to engage the inside circumferential surface 98 of the hollow, tubular portion 76 of the motor output shaft 38 in a desired manner, such as with an interference fit (e.g., press-fit or shrink-fit) to not only rotationally couple the heat sink element 104 to the motor output shaft 38, but also to permit desired heat transfer between the heat sink element 104 and the motor output shaft 38. In the example provided, a shrink fit that provides 12 to 52 microns of interference at room temperature is employed between the outside circumferential surface 170 of the outer rim 122 and the inside circumferential surface 98 of the hollow, tubular portion 76 of the motor output shaft 38. In the example provided, the outer rim 122 extends about the full circumference of the heat sink element 104. Optionally, a plurality of longitudinally extending, circumferentially spaced-apart grooves 176 can be formed on the outside circumferential surface 170 of the outer rim 122.

While the outer rim 122 has been shown as extending over the full circumference of the heat sink element 104, it will be appreciated that the outer rim could be formed somewhat differently. For example, the heat sink element 104a of FIG. 7 employs an outer rim 122a that is formed of a plurality of circumferentially spaced-apart rim segments 180 that are each fixedly coupled to an associated one of the first rib members 124.

Figure 6:
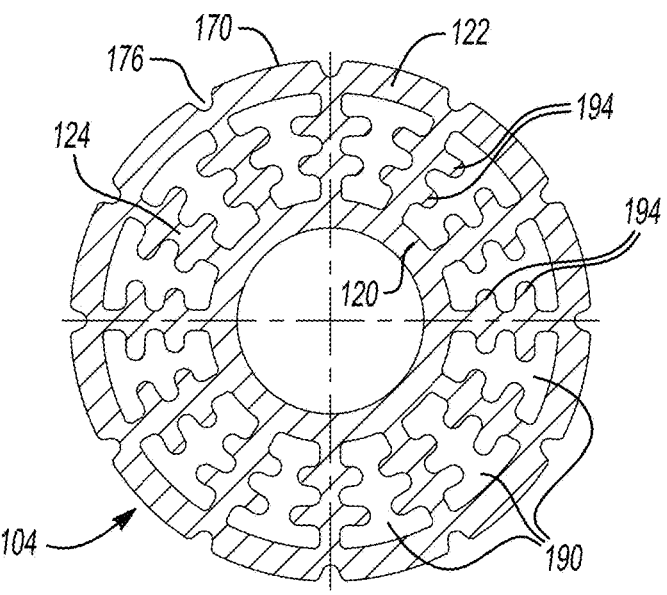
FIG. 6 is a sectional view of the heat sink element of FIG. 3 taken perpendicular to a longitudinal axis of the heat sink element.
Figure 7:
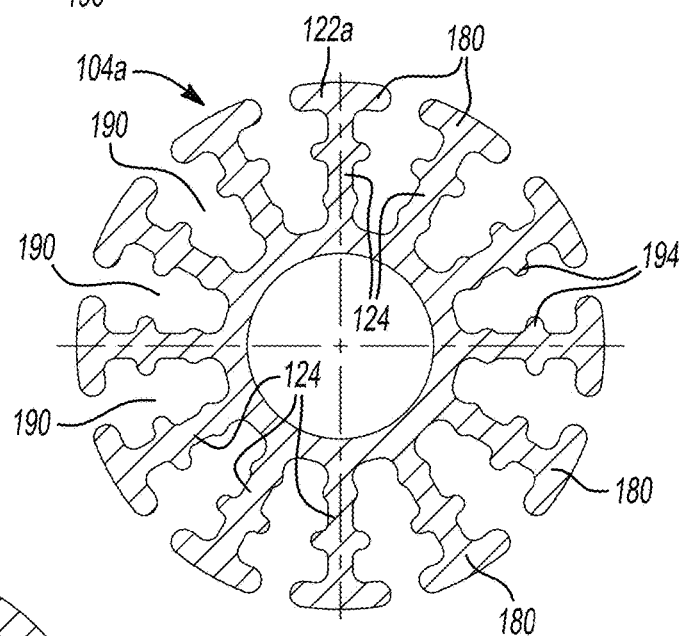
FIGS. 7 through 10 are views that are similar to that of FIG. 6 but which depict alternately configured heat sink elements.
Figure 8:
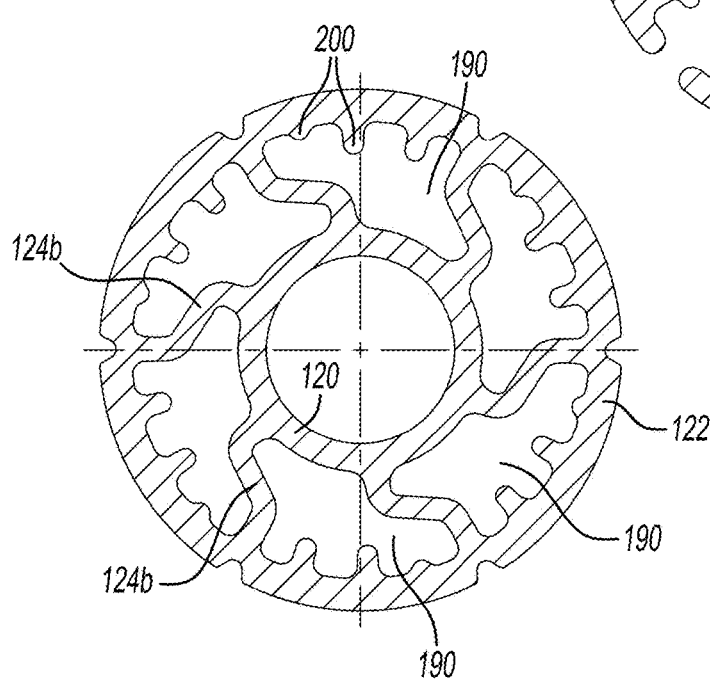
Figure 9:
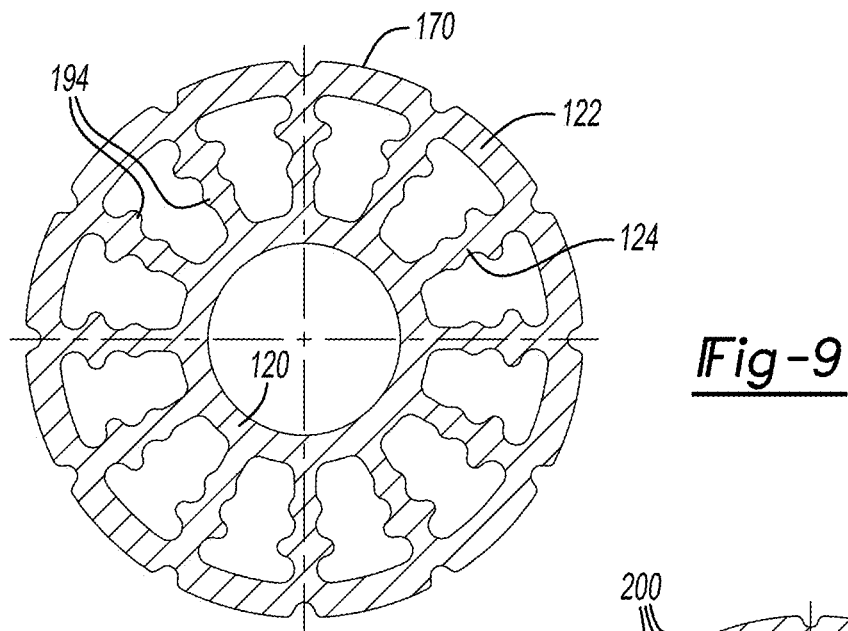

Returning to FIGS. 3 and 6, each of the first rib members 124 can extend generally radially between the central hub 120 and the outer rim 122 such that a plurality of discrete coolant return passages 190 are formed through the heat sink element 104. The discrete coolant return passages 190 can have any desired cross-sectional shape. Moreover, the first rib members 124 need not extend in a purely radial direction. In the example of FIG. 8, a portion of each of the first rib members 124b extends in a circumferential direction with increasing distance from the central hub 120 in a radial direction. If desired, one or more longitudinally extending fin members 194 can be formed onto each of the first rib members 124 as is shown in the examples of FIGS. 6, 7 and 9.

Figure 10:
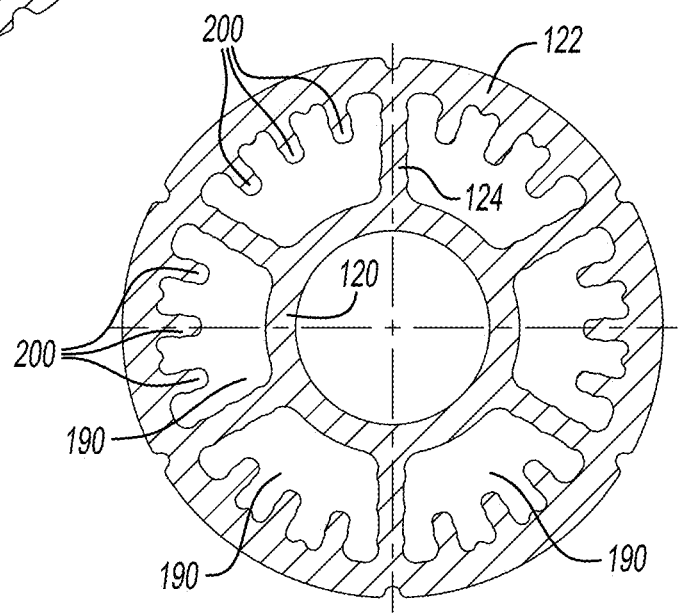

Optionally, a plurality of second rib members 200 can be formed onto the outer rim 122 as shown in FIGS. 8 and 10. The second rib members 200 can extend radially inwardly from the outer rim 122 into associated ones of the discrete coolant return passages 190. In the example of FIG. 10, the second rib members 200 are formed with a uniform radial height. However, it will be appreciated that two or more distinct and different radial heights could be employed for the second rib members 200, as is shown in FIG. 8.

Returning to FIGS. 2, 3 and 5, the heat sink elements 104 can be abutted against one another to form the heat sink 44. In this condition, the central hubs 120 of the heat sink elements 104 abut one another and cooperate to form a coolant supply passage 210 that extends through the heat sink 44. At least one axial end 212 of the central hub 120 of each of the heat sink elements 104 can extend axially further along the longitudinal axis of the heat sink element 104 than the outer rim 122, the first rib members 124 and if included, the second rib members 200 (FIG. 8) and the longitudinally extending fin members 194 so that a void annular space 220 is provided between the discrete coolant return passages 190 of adjacent pairs of the heat sink elements 104.

Optionally, a rotational offset can be employed between adjacent ones of the heat sink elements 104 so that the discrete coolant return passages 190 in each of the heat sink elements 104 are offset rotationally about a longitudinal axis of the heat sink 44 relative to an adjacent one of the heat sink elements 104. With reference to FIGS. 2 through 5, the heat sink elements 104 in each abutting pair of heat sink elements 104 may optionally employ a clocking element 230 and a mating clocking element 232, respectively, that engage one another to rotationally stagger the discrete coolant return passages 190 in the abutting pair of heat sink elements 104 about the longitudinal axis of the heat sink 44 by a predetermined rotational offset. In the example provided, the clocking element 230 is a tab that extends axially from the central hub 120 of a first one of the abutting heat sink elements 104 and the mating clocking element 232 is a recess that is formed in the central hub 120 of a second one of the abutting heat sink elements 104. The tab can be received into the recess in a slip-fit manner.

The heat sink elements 104 can be assembled to one another (i.e., to form the heat sink 44) such that the central hubs 120 abut one another and if employed, the clocking elements 230 and the mating clocking elements 232 engage one another. If desired, the heat sink 44 can be cooled, for example with liquid nitrogen, and/or the motor output shaft 38 can be heated to permit the heat sink 44 to be inserted through the open end of the hollow, tubular portion 76 of the motor output shaft 38 and seated in a desired location. In the example provided, the heat sink 44 is cooled in liquid nitrogen to permit the heat sink 44 to contract so that the heat sink 44 slides into the hollow, tubular portion 76 of the motor output shaft 38 with little to no force.

In operation, a flow of liquid coolant can be supplied through the stationary coolant supply pipe 160 into the coolant supply passage 210 in the heat sink 44. The liquid coolant can exit the axially opposite side of the heat sink 44 and impinge or contact the axial end 250 of the plug portion 88 that faces into the hollow, tubular portion 76 of the motor output shaft 38. The axial end 250 can be contoured in any desired manner and directs the flow of liquid coolant radially outward and back toward the heat sink 44 where the liquid coolant enters the discrete coolant return passages 190 in the heat sink element 104 that is closest to the end member 72. Coolant exiting the discrete coolant return passages 190 of the heat sink element 104 that is closest to the end member 72 enters into the void annular space 220 that is disposed between adjacent heat sink elements 104 prior to entering the discrete coolant return passages 190 in the adjacent heat sink element 104. The void annular space 220 and if included, the rotational displacement between the discrete coolant return passages 190 of the adjacent pair of heat sink elements 104 disrupts the flow of the liquid coolant, creating turbulence in the flow and reducing the thickness of the boundary layer of the liquid coolant that is formed on the interior surfaces of the discrete coolant return passages 190. Consequently, improved heat transfer from the heat sink 44 to the liquid coolant is obtained relative to a monolithic heat sink.

While the heat sink 44 has been described as being formed of identical heat sink elements 104, it will be appreciated that the heat sink 44 could be formed of two or more different types of heat sink elements 104. In one example, the two or more different types of heat sink elements 104 can employ different configurations of the outer rim 122 and/or the first rib members 124 and/or the second rib members 200. In another example, the interior heat sink elements (i.e., the heat sink elements 104 that are located in between the first and last heat sink elements 104 of the heat sink 44) could be formed as described above with the exception that the outside circumferential surface 170 of the outer rim 122 of the interior heat sink elements 104 is sized somewhat smaller in diameter, for example to provide a transition fit between the interior heat sink elements and the hollow, tubular portion 76 of the motor output shaft 38. It will be appreciated that the heat sink elements 104 at the opposite axial ends of the heat sink 44 are fixedly engaged to the motor output shaft 38 to thereby inhibit relative axial movement of the heat sink 44 along the motor axis 46. If desired, the clocking elements and the mating clocking elements 232 can be employed to additionally inhibit relative rotational movement of the interior heat sink elements 104 relative to the heat sink elements 104 at the opposite axial ends of the heat sink 44.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric drive unit comprising:
   a stator;
   a rotor received in the stator and being rotatable about an axis;
   a motor output shaft received through the rotor, the motor output shaft being coupled to the rotor for rotation therewith, the motor output shaft having a hollow, tubular portion;
   a heat sink received in the hollow, tubular portion of the motor output shaft, the heat sink being formed of a plurality of heat sink elements, each of the heat sink elements being integrally and unitarily formed to include a central hub, an outer rim and a plurality of first rib members that fixedly couple the central hub to the outer rim, the central hub being hollow and disposed concentrically about the axis, the outer rim being disposed concentrically about the central hub and engaging an inside circumferential surface of the hollow, tubular portion of the motor output shaft, each of the first rib members extending generally radially between the central hub and the outer rim such that a plurality of discrete coolant return passages are formed through the heat sink, the heat sink elements abutting one another such that the central hubs of the heat sink elements form a coolant supply passage that extends through the heat sink, wherein at least one axial end of the central hub extends along the axis further than the outer rim and the first rib members so that a void annular space is provided between the discrete coolant return passages of adjacent pairs of the heat sink elements.

2. The electric drive unit of claim 1, wherein the discrete coolant return passages in each abutting pair of heat sink elements are offset about the axis in a rotational direction relative to one another.

3. The electric drive unit of claim 2, wherein the heat sink elements in each abutting pair of heat sink elements has a clocking element and a mating clocking element, respectively, wherein the clocking element and the mating clocking element engage one another to rotationally stagger the discrete coolant return passages by a predetermined rotational offset.

4. The electric drive unit of claim 3, wherein the clocking element is a tab that is fixedly coupled to and extends from the central hub of a first one of the abutting pair of heat sink elements, and wherein the mating clocking element is a recess that is formed into the central hub of the other one of the abutting pair of heat sink elements, wherein the tab is received into the recess.

5. The electric drive unit of claim 4, wherein the tab engages the recess in a slip-fit manner.

6. The electric drive unit of claim 1, wherein the outer rim of at least a first portion of the heat sink elements is sized to engage the inside circumferential surface of the hollow, tubular portion of the motor output shaft with an interference fit.

7. The electric drive unit of claim 6, wherein the outer rim of a second portion of the heat sink elements is sized to engage the inside circumferential surface of the hollow, tubular portion of the motor output shaft with a transition fit.

8. The electric drive unit of claim 1, wherein the outer rim of each heat sink element extends fully about the circumference of the heat sink element.

9. The electric drive unit of claim 8, wherein a plurality of longitudinally extending, circumferentially spaced-apart grooves are formed in the outer rim of each of the heat sink elements.

10. The electric drive unit of claim 1, wherein each of the heat sink elements includes a plurality of second rib members, each of the second rib members being fixedly coupled to and extending radially inwardly from the outer rim.

11. The electric drive unit of claim 1, further comprising a transmission and at least one output shaft, the transmission transmitting rotary power between the motor output shaft and the at least one output shaft.

12. The electric drive unit of claim 11, further comprising a differential assembly having a differential input and a pair of differential outputs, the differential input being directly driven by the transmission.

13. The electric drive unit of claim 1, wherein the heat sink elements are formed of aluminum.

14. The electric drive unit of claim 1, further comprising a housing and a coolant supply pipe, the stator being fixedly coupled to the housing, the coolant supply pipe being coupled to the housing and extending into the central hub of a first one of the heat sink elements.

15. The electric drive unit of claim 14, wherein a bushing is disposed radially between the central hub of the first one of the heat sink elements and the coolant supply pipe.

* * * * *